US006076998A

United States Patent [19]

Okuya

[11] Patent Number: 6,076,998

[45] Date of Patent: Jun. 20, 2000

[54] REPLACEABLE BLADE FOR DEBURRING DEVICE

[76] Inventor: Yasuaki Okuya, Sora-machi 52, Heisaka-cho, Nishio-shi, Aichi-ken, Japan

[21] Appl. No.: 09/131,343

[22] Filed: Aug. 7, 1998

[30] Foreign Application Priority Data

Nov. 12, 1997 [JP] Japan .................................... 9-310180

[51] Int. Cl.[7] .................................................. B26D 3/28

[52] U.S. Cl. ................................ 407/15; 407/16; 407/17; 407/18; 30/314; 83/856

[58] Field of Search ................................ 407/15, 16, 17, 407/18; 409/139, 140, 297, 298, 300; 83/856, 857, 858; 30/314, 315, 299, 304, 305

[56] References Cited

U.S. PATENT DOCUMENTS

| | | | |
|---|---|---|---|
| 1,440,933 | 1/1923 | Perkins et al. | 407/17 |
| 3,460,220 | 8/1969 | Connelly | 407/17 |
| 5,555,787 | 9/1996 | Barber et al. | 83/856 X |
| 5,819,628 | 10/1998 | Cogan et al. | 83/856 X |

FOREIGN PATENT DOCUMENTS

| | | | |
|---|---|---|---|
| 2556631 | 6/1985 | France | 407/15 |
| 934861 | 11/1955 | Germany | 407/15 |
| 59-8718 | 1/1984 | Japan . | |
| 8-4206 | 2/1996 | Japan . | |
| 0627929 | 10/1978 | U.S.S.R. | 407/15 |
| 112398 | 1/1918 | United Kingdom | 407/15 |

*Primary Examiner*—Henry W. H. Tsai
*Attorney, Agent, or Firm*—Armstrong, Westerman, Hattori, McLeland & Naughton

[57] ABSTRACT

A replaceable blade for a deburring device which is installed in a deburring mold with a cavity for inserting and pulling out a work. The replaceable blade comprises a main body, several intake channels which are provided from the surface to the inside of the main body, a vertical slot which penetrates through in the longitudinal direction of the main body and connects with the intake channel for leading burrs and several cutting edges provided in the main body of the blade. The intake channel for leading burrs is provided in the main body diagonally, as seen from the front of the main body. Mentioned several cutting edges are provided at the lower part of the surface portion of each intake channel.

3 Claims, 9 Drawing Sheets

REPLACEABLE BLADE FOR DEBURRING DEVICE

BACKGROUND OF THE INVENTION

1. Technical Field

The present invention relates to a replaceable blade for a deburring device that is installed in a deburring mold for cutting burrs off a work and for leading and releasing removed burrs.

2. Description of the Prior Art

Regarding to the conventional deburring device, the recognized disadvantage is that in case of removing relatively small burrs on surface of a work all together, the heat generated from the work causes its deformation or damage while a load on the blade causes damage of blade. The prior art discloses several procedures for resolving mentioned problem. For example, the method and the device for continuous self-deburring, which removes burrs little by little with using a multistage broaching cutter installed in a mold, have been employed for practical use. This procedure is disclosed in following references. (1) Japanese unexamined utility model publication No.59-9818 discloses a surface broach with the construction that releases scraps from the bottom throughout a hole made between blades. (2) Japanese examined utility model publication No.3-9943 discloses a deburring device with the construction wherein several broaching cutters are installed in the cutter holder in valley shape and inclined gaps for releasing scraps are provided lengthwise direction in these broaching cutters. (3) Japanese examined utility model publication No.8-4206 discloses a blade for a deburring device with multistage cutting edges on both sides. These cutting edges protrude to the direction of cutting edges one after another. A hole is made between mentioned cutting edges at sides for releasing removed burrs.

These prior arts mentioned above as (1), (2), (3) try to release removed burrs outside of the device and provide holes for releasing burrs between two blades next to each other. But they don't have the construction in which a hole for releasing burrs connects with a cutting edge of a blade that cut off those burrs. Namely, they don't have any procedure for leading burrs cut off to the certain hole for releasing. As a result, burrs cut off tend to remain inside of a mold and it is impossible to lead those burrs reliably and smoothly; moreover, it causes a large load on cutting edge of the blade.

SUMMARY OF THE INVENTION

The present invention provides a replaceable blade for a deburring device which is installed in a deburring mold with a cavity for inserting and pulling out a work, comprising:

- a main body of a replaceable blade,
- several intake channels for leading burrs provided from the surface to the inside of mentioned main body,
- a vertical slot for dropping burrs which penetrates through longitudinal direction of mentioned main body while connects with the inside portion of mentioned intake channel for leading burrs,
- and several multistage cutting edges made in mentioned main body,
- wherein each of mentioned intake channels for leading burrs is provided diagonally, as seen from the front, on the main body,
- and mentioned several cutting edges are provided at the lower part of the surface portion of each intake channel for leading burrs.

In more preferable embodiments, mentioned vertical slot for dropping burrs is provided vertically in the center portion of the main body.

In preferable embodiments of the invention, mentioned intake channel for leading burrs is inclined downward from the cutting edge on the surface portion of the main body to the inside of the main body.

In further preferable embodiments of the invention, mentioned deburring mold is a split mold.

Accordingly, an object of the invention is to provide a replaceable blade for a deburring device capable of cutting burrs off a work and releasing removed burrs outside of the deburring device fast and smoothly while reducing a load on the cutting edge of the blade.

Another object of the present invention is to provide a replaceable blade for a deburring device capable of reducing the weight of a main body of the replaceable blade and removing burrs reliably and smoothly.

A further object of the present invention is to provide a replaceable blade for a deburring device capable of leading removed burrs, which are cut off by the replaceable blade itself, to the slot (hole) for dropping burrs reliably and smoothly.

Another object of the invention is to provide a replaceable blade for a deburring device which promotes the use for general-purpose and cost performance.

DETAILED DESCRIPTION OF THE PREFERRED EMBODIMENTS

According to the present invention, the replaceable blade is installed in a mold for deburring burrs with a cavity for inserting and pulling out a casting (a work) (hereinafter mentioned as a "mold"), in other words, an object of deburring. The cavity for inserting and pulling out a work is formed inside of the mold by fitting one or several mentioned replaceable blades in the mold. The replaceable blade can be replaced easily as the need arises.

Figure 2:
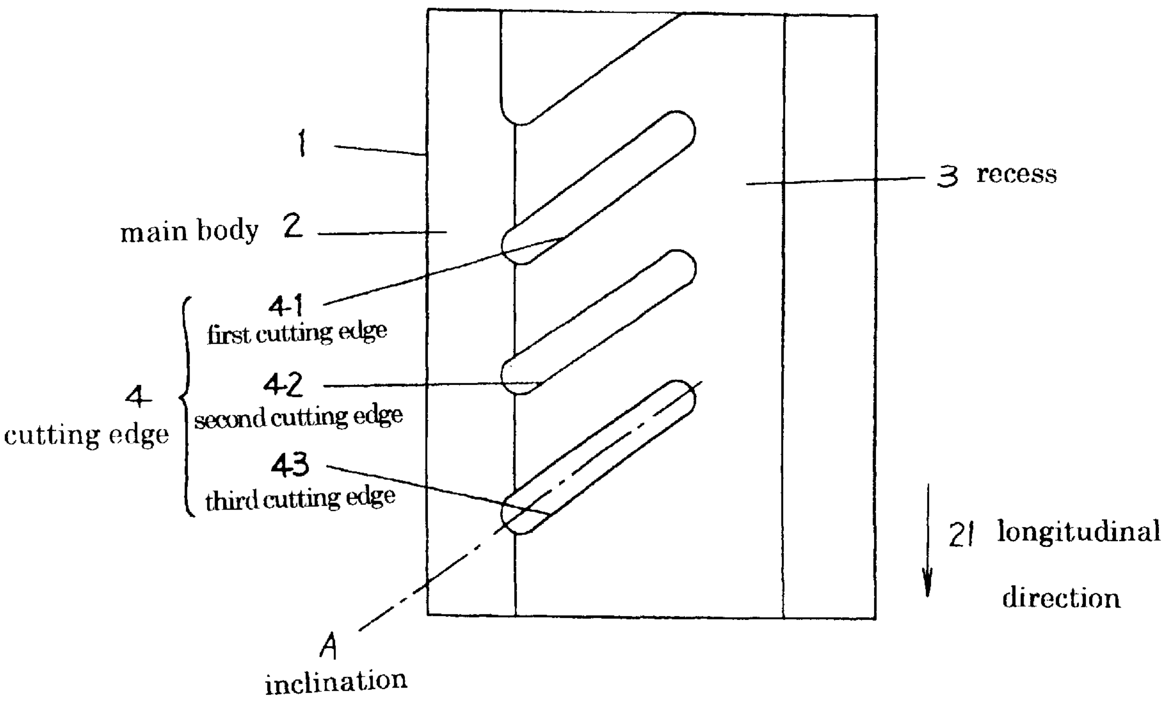
FIG. 2 is an enlarged front view illustrating one example of a main body of the replaceable blade.
Figure 3:
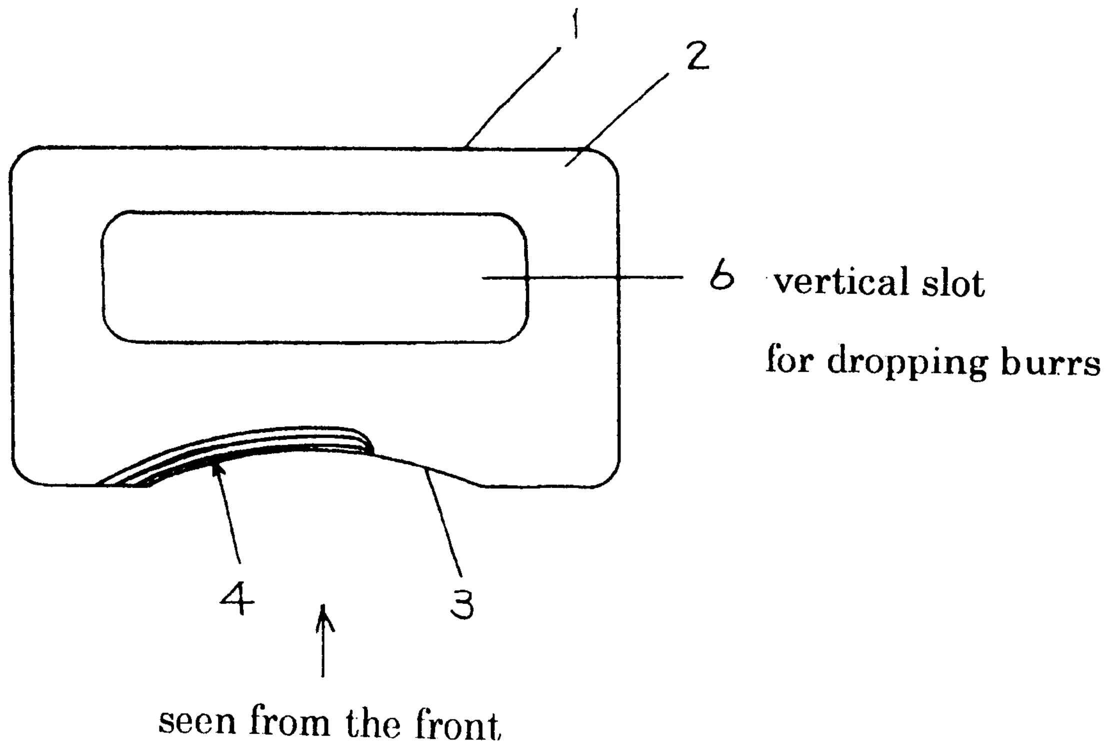
FIG. 3 is an enlarged top plan view illustrating one example of the main body of the replaceable blade.

In these embodiments, the casting (the work), namely, an object of deburring is forced, for example, with the upper mold into mentioned cavity for inserting and pulling out a work. At that time, burrs remained on the surface of the work, are cut off to a minimum degree by the multistage cutting edges of the blade. The multistage cutting edges are provided diagonally in the longitudinal direction of the main body (the longitudinal direction means vertical in FIG. 2) and protrude downward to the bottom of said longitudinal direction one after another. In this case, the multistage cutting edge is provided in the form wherein the cutting edges protrude in the surface portion of the main body one by one towards the bottom of the main body. As a result, the present blade has features that reduce the load on each cutting edge of the blade and prevent the heat generation from mentioned cutting edges of blade, the work and removed burrs.

The replaceable blade for a deburring device of the invention has the construction wherein intake channels for leading removed burrs are provided and the lower part of the surface portion of said channels connect with cutting edges of the replaceable blade. Therefor, removed burrs are withdrawn through intake channels for leading burrs immediately after being cut off. Accordingly, the present invention has features that being capable of taking in and releasing those burrs cut off by cutting edges and preventing intake channels for leading burrs from being enclosed by removed burrs, and clogging up. Those burrs withdrawn through mentioned channels get out of the deburring device with using the vertical slot for dropping burrs.

The replaceable blade for a deburring device of the present invention is explained here considering accompanied drawings.

Figure 4:
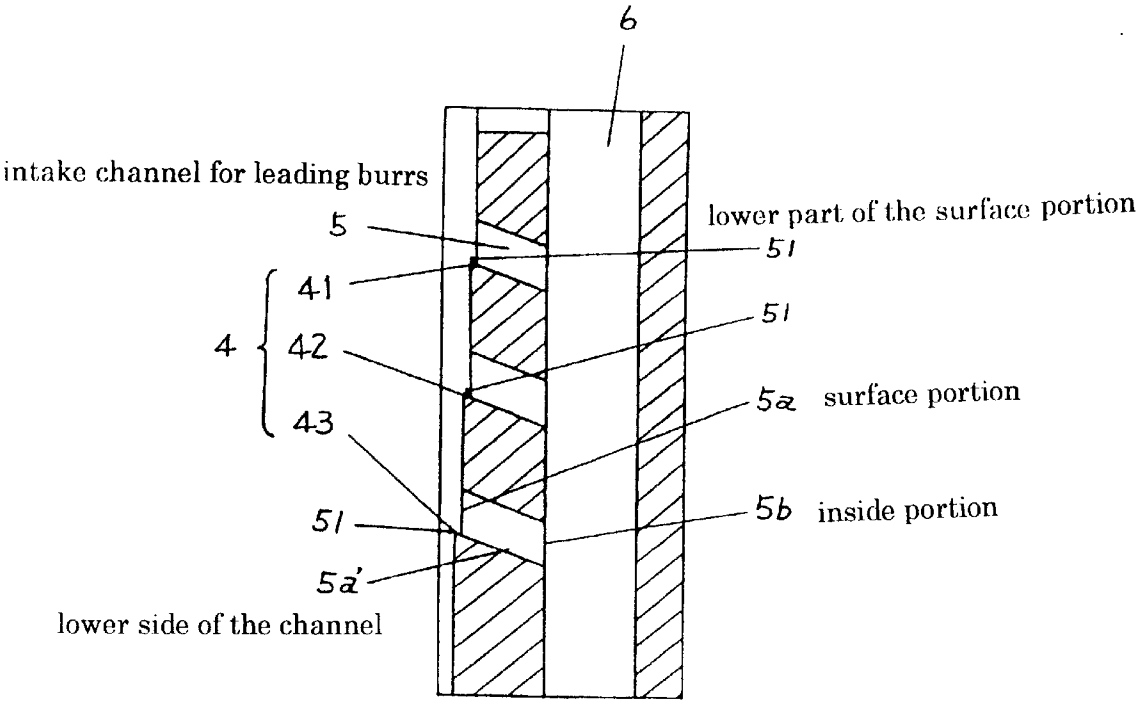
FIG. 4 is an expanded sectional view illustrating one example of the main body of the replaceable blade.

In FIG. 1 to FIG. 9, there is shown a replaceable blade 1. The replaceable blade 1 comprises a main body 2, a recess 3 provided vertically in one side of the main body 2, several multistage cutting edges 4, 4••• provided in the recess 3 diagonally with a certain degree of an angle, as seen from the front (as shown with an arrow in FIG. 3 and FIG. 6) (in drawings, the first blade is 41, the second is 42, and the third is 43, but the number of the blade edge is not limited in the present invention. These cutting edges are generally named as 4), several intake channels 5, 5••• for leading burrs (generally named as intake channels 5 for leading burrs) provided from the surface 5*a* of the main body 2 to the inside 5*b*, and a vertical slot 6 for dropping burrs which penetrates through the center portion of the main body 2 and connects with the inside portion 5*b* of channel 5. Multistage cutting edges 4 are formed on the lower part of the surface portion 51 of several intake channels 5 for leading burrs as shown in FIG. 4. These multistage cutting edges 4 have a construction wherein each cutting edge protrudes to the direction of cutting edges one after another from the top to the bottom of the main body, in order to reduce the load on each cutting edge and prevent the heat generation from the work and removed burrs. In case of this example, the second cutting edge 42 protrudes more than the first cutting edge 41, the third cutting edge 43 protrudes more than the second cutting edge 42 towards the surface portion 5*a*. (Each cutting edge protrudes one by one downward in the longitudinal direction 21 of the main body 2 in FIG. 2). The forms of the main body 2 and the cutting edges 4 are one of examples and the invention is not limited by the form of these drawings.

Figure 5:
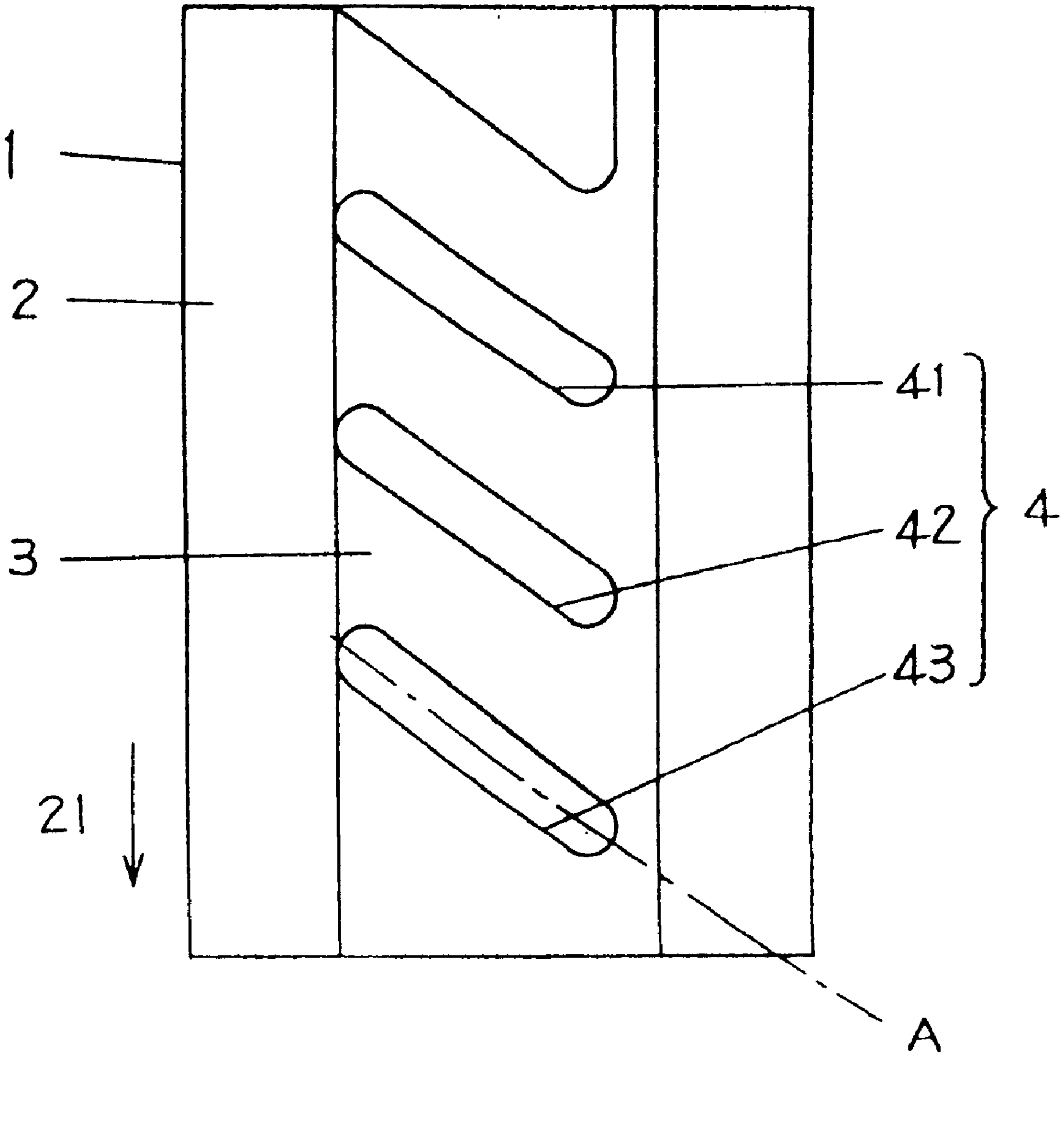
FIG. 5 is an enlarged front view illustrating another example of the main body of the replaceable blade.
Figure 6:
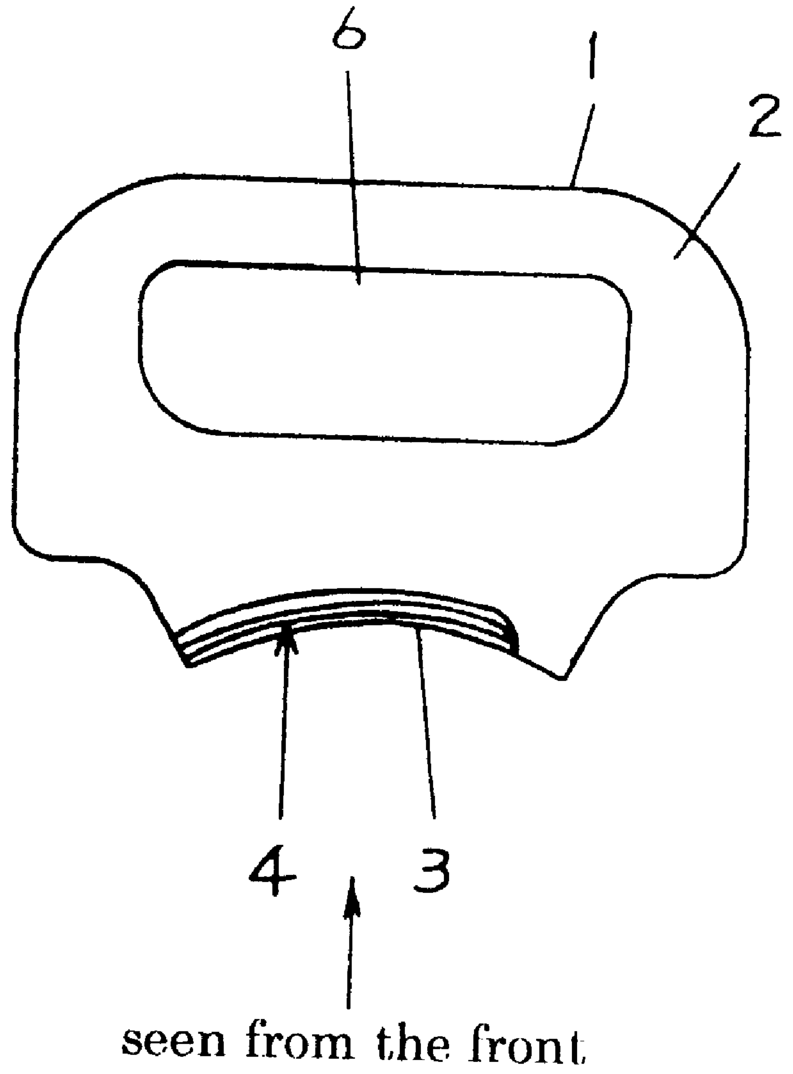
FIG. 6 is an enlarged top plan view of another example of the main body of the replaceable blade.
Figure 7:
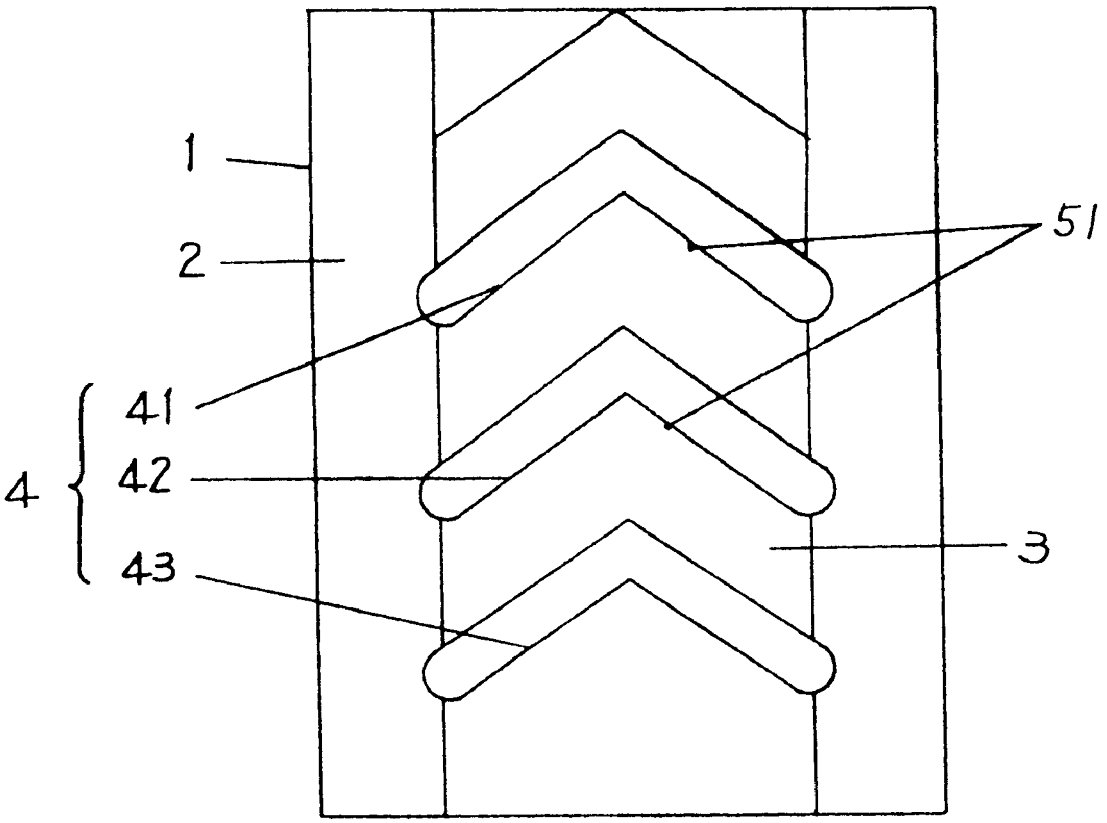
FIG. 7 is an enlarged front view illustrating the other example of the main body of the replaceable blade.

Referring now the intake channel 5 for leading burrs. The lower side 5*a'* of the channel 5 is inclined downward from the surface portion 5*a* through to the inside portion 5*b* of the main body 2. Those burrs cut off (removed) are taken in along the inclined plane. Those burrs taken in are withdrawn at the bottom throughout the vertical slot 6 for dropping burrs, which penetrates through the center portion of the main body 2. Because the lower part of the surface portion 51 of the intake channel 5 is connected with mentioned cutting edges 4, those removed burrs are led directly to the channel 5 and withdrawn. The cutting edge 4 and the intake channel 5 for leading burrs are provided diagonally as seen from the front of the main body (the front from the cavity for inserting and pulling out a work), so that they lead removed burrs to the intake channel 5 reliably, and reduce the load on the cutting edge 4. In case that the cutting edge 4 and the intake channel 5 for leading burrs are inclining to one direction as shown in FIG. 5, the prevention measure for movement (rash act) of a work in the cavity for inserting and pulling out a work should be provided. Examples of prevention measures for rash act include the cutting edge 4 and channel 5 inclining to the opposite direction, or guide (not shown in the drawing) and the like.

Figure 1:
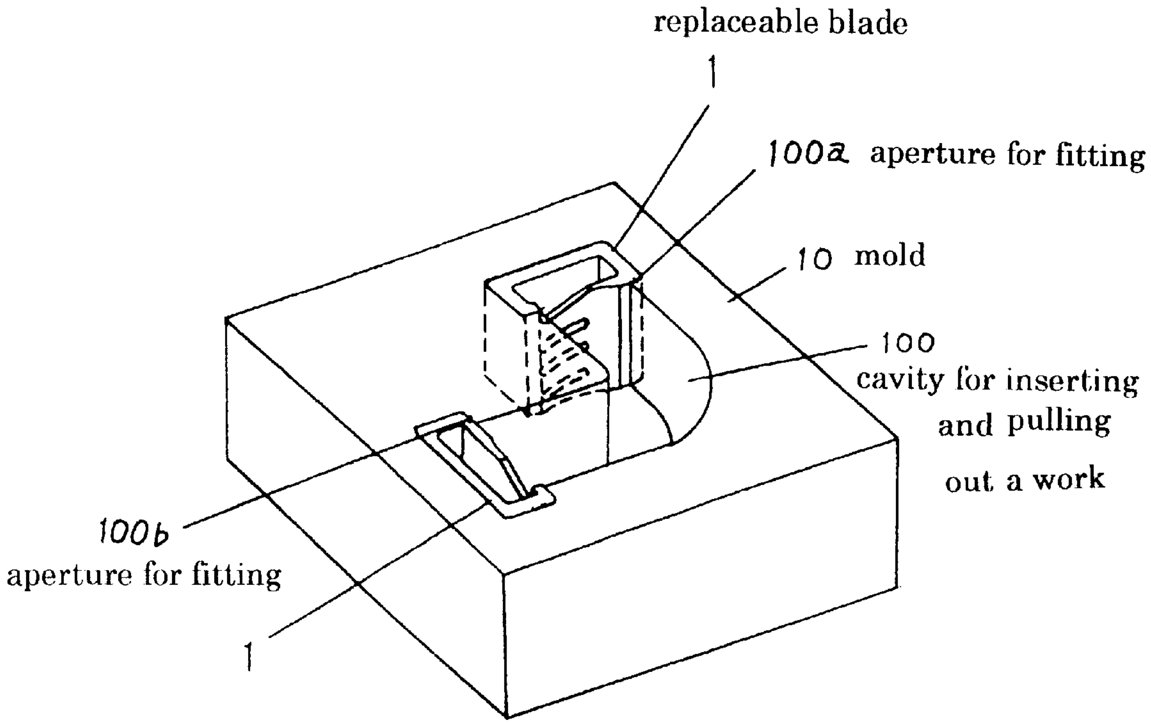
FIG. 1 is a perspective view illustrating a state wherein a replaceable blade is installed in a mold.

The replaceable blade 1 constructed as mentioned above, is fit into the cavity 100 for inserting and pulling out a work provided in a mold 10 shown in FIG. 1. Concretely, the replaceable blade 1 is inserted from the top and sunk into apertures for fitting 100*a* and 100*b* of the cavity 100. (The replaceable blade is installed in the mold 10 by measure of sinking). As a result, cutting edges 4 of the replaceable blade 1 are settled at both sides; 100*a* and 100*b*. A work (not shown in the drawing) is forced into the cavity 100 of the mold 10 with the replaceable blade 1 fit in. This work is pushed downward to the bottom of the cavity 100 by the pushing mold (the upper mold) that is not shown in the drawing. By the process of pushing, those burrs remained on the work are removed. The replaceable blade 1 that is installed as above is pulled out of the mold 10 by hand or a fitment for pulling out. Then, another replaceable blade 1 is installed in the mold 10.

Figure 8:
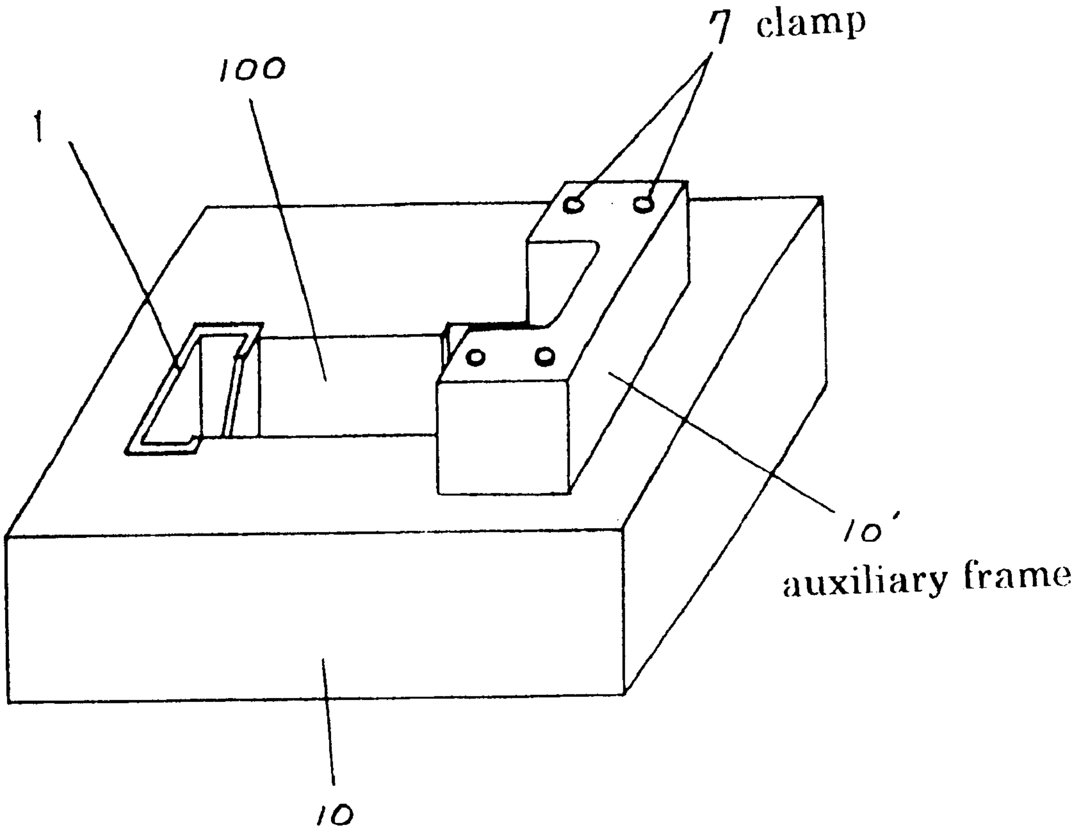
FIG. 8 is a perspective view illustrating the state wherein the replaceable blade is installed in another mold.
Figure 9:
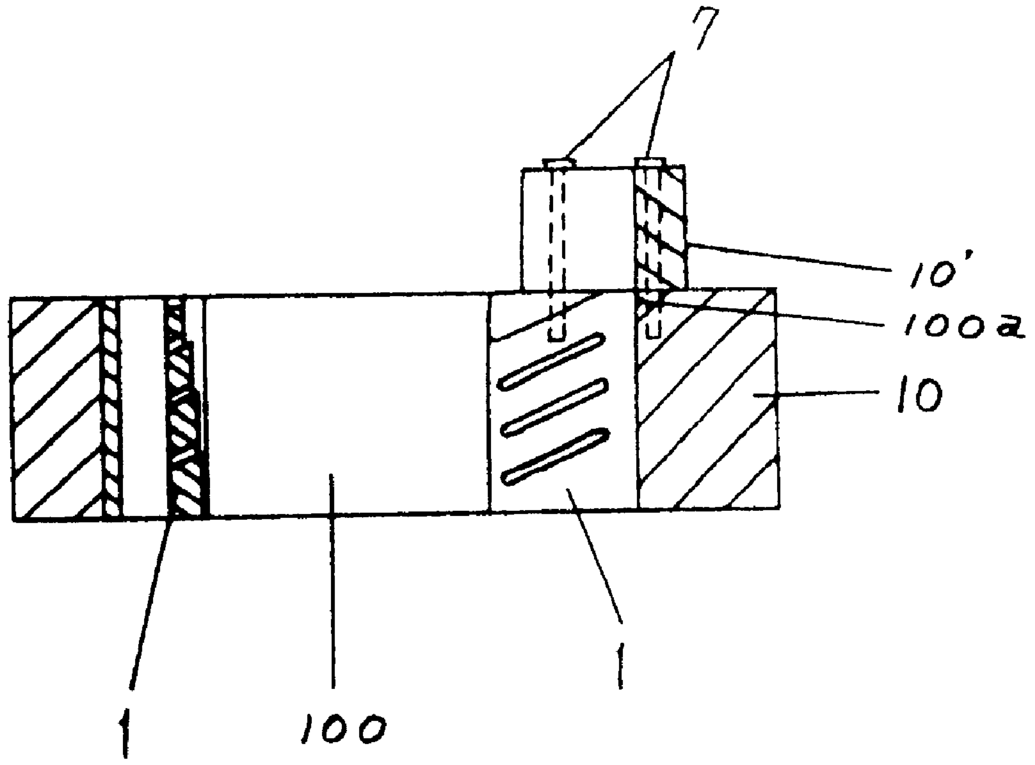
FIG. 9 is a top plan view of the FIG. 8.

In FIG. 8 and FIG. 9, there is shown an auxiliary frame 10'. The auxiliary frame 10' is installed in the mold 10. The auxiliary frame 10' may have the construction wherein installed and removed by clamps 7 such as bolts. Also, the auxiliary frame 10' may have the construction wherein installed and removed by a fitting bar (not shown in the drawing). The cavity 100 for inserting a work or the aperture for fitting 100*a* (100*b*) is provided in the auxiliary frame 10'. The installation of the auxiliary frame improves the efficiency of the mold. Moreover, it is possible to avoid a loss such as a waste of time and material that generate in case that the mold and the auxiliary frame are formed together from the beginning. For the mentioned installation, a fitting bar or a clamp can be used. Other constructions and effects are same as stated above.

In this invention, the replaceable blade for a deburring device, which has a mold with a cavity for inserting and pulling out a work and the replaceable blade, comprises the main body, the intake channel for leading burrs, the slot for dropping burrs which connects with the mentioned leading channel and multistage cutting edges. Mentioned intake channel for leading burrs is provided diagonally in the main body while having a construction wherein above mentioned cutting edges are formed at the lower part of the surface portion of mentioned channel. As a result, the replaceable blade of the invention has features as follows:

(A) capable of cutting burrs off the work and releasing burrs cut off to outside of the device fast and smoothly, (B) capable of reducing the load on cutting edges.

Furthermore, because of having the construction wherein cutting edges and intake channels for leading burrs are inclined, as seen from the cavity for inserting and pulling out a work, the replaceable blade for a deburring device has features as follows:

(C) capable of leading removed burrs reliably to the intake channel for leading burrs, (D) capable of reducing the load on cutting edges and preventing the heat generation from cutting edges, (E) capable of preventing the intake channel for leading burrs from being filled up.

In case that the vertical slot for dropping burrs penetrates through the center of the main body, the replaceable blade has also a following feature:

(F) capable of reducing the weight of the main body and releasing burrs cut off reliably and smoothly.

And in case that the intake channel for leading burrs is inclined downward from the surface of the main body to the inside, the replaceable blade has a following effect:

(G) capable of leading removed burrs cut off by cutting edges of the main body to the vertical slot for dropping burrs reliably and smoothly.

Particularly in case of the deburring mold is a split mold wherein an auxiliary frame is installed in a mold, the replaceable blade has a following effect:

(H) capable of improving the use for general-purpose and cost performance.

The entire disclosure of Japanese Patent Application No.H9-310180 filed on Nov. 12, 1997 including specification, claims and summary are incorporated herein by reference in their entirety.

While the invention has been described with reference to specifically preferred embodiments, those skilled in the art recognize that various modifications can be made without departing from the spirit and scope thereof.

What is claimed is:

1. A replaceable blade for deburring device which is installed in a deburring mold with a cavity for inserting and pulling out a work, comprising:

a main body having a front portion, several intake channels for leading burrs provided from said surface portion to inside of the main body, a vertical slot for dropping burrs which penetrates through the longitudinal direction of main body and is in connection with an inside portion of the intake channel for leading burrs, and several multistage cutting edges provided in the main body wherein the intake channel for leading burrs is provided on the main body diagonally relative to the longitudinal direction of the main body, and the several cutting edges are provided at the lower part of the surface portion of the intake channel for leading burrs.

2. The replaceable blade of claim 1, wherein said slot for dropping burrs is provided vertically in the center portion of the main body.

3. The replaceable blade of claim 1, wherein said intake channel for leading burrs is inclined downward from the cutting edge on the surface portion of the main body to the inside of the main body.

* * * * *